United States Patent Office 3,407,439
Patented Oct. 29, 1968

3,407,439
THRUST BEARING FOR ROTATING SCREW
Robert B. Gregory, Flemington, N.J., assignor to Frank W. Egan & Co., Somerville, N.J., a corporation of New Jersey
Filed Sept. 29, 1966, Ser. No. 582,864
18 Claims. (Cl. 18—12)

ABSTRACT OF THE DISCLOSURE

A hydrostatic thrust bearing especially applicable for use with a plastic screw extruder having a barrel, which is provided with a longitudinal bore, intake means communicating with the rear portion of the bore and discharge means communicating with the forward portion of the bore, and a rotary extruder screw in the bore and adapted to move plastic material, that is introduced into the bore by way of the intake means, forwardly along the bore to the discharge means, the material in the course of such movement being subjected to a differential pressure which exerts a rearward axial thrust on the screw. The thrust bearing includes a thrust barrel, which is provided with a longitudinal second bore and an inlet for introducing fluid into the rear portion of the second bore, and a rotary thrust screw in the second bore. The extruder screw and the thrust screw are coaxial and of opposite hand and project in opposite directions. The forward end of the thrust screw and the thrust barrel define a thrust gap which communicates with the second bore and with the inlet. Simultaneous rotation is imparted to the screws by a rotary drive which is preferably located between and connected to the rear ends of the screws.

---

This invention relates to the art of bearings and, more particularly, to a relatively small diameter hydrostatic bearing capable of properly and effectively wtihstanding relatively large thrust loads. The invention pertains, in one of its more specific aspects, to hydrostatic thrust bearings that are adapted to be advantageously utilized in machines having parallel twin rotary screws in which the distance between the axes of the screws is not greater than the diameter of one of the screws.

The bearing of this invention may be beneficially employed in various environments in which high thrust loads are present. It is especially useful in twin or multiple screw plastic extruding machines. Accordingly and by way of example, the ensuing discussion and detailed description of the invention will be directed to such a machine.

One of the problems encountered in the design of plastic screw extruders is that of providing suitable means to adequately absorb the backward thrust load on the rotating screws. This thrust load is the difference between the plastic pressure at the feed end of the screw and that at the discharge end of the screw. The pressure at the feed end is usually at or near atmospheric while the pressure at the discharge end may attain a value of 6,000 p.s.i. (pounds per square inch) or higher, depending on the operating conditions. This pressure differential acts on an area equal to the cross sectional area of the screw. Hence, on a 3½" diameter screw, operating at a discharge pressure of 6,000 p.s.i., the differential pressure creates a thrust load of about 58,000 pounds.

In the case of a single rotary screw extruder, the thrust load is usually taken up by a known type of standard ball bearing or roller thrust bearing. When extremely high thrust loads are encountered, it is usual practice to employ tandem type roller bearings. Both single and tandem type bearings are necessarily large in diameter and are usually in the range of from four to six times the screw diameter in order to assure requisite thrust capacity and reasonable bearing life.

A different situation exists, however, in the case of a twin or multiple screw extruder in which the distance between the screw axes is equal to the screw diameter in tangential screws or less than the screw diameter in overlapping or intersecting screws, thereby limiting the diameter of at least one thrust bearing to approximately the distance between the screw axes. In order to obtain required thrust capacity with known bearings, it is necessary to arrange them in stacked relationship. This requires complex means to distribute the load equally among the several bearings in the stack. This type of arrangement results in a number of objections and shortcomings including high initial cost, troublesome maintenance problems and inability to attain long bearing life at high loads.

One known thrust bearing arrangement for multiple screws contemplates the provision of a pair of helical gears to transfer a portion of the thrust load from one screw to the other and a large mechanical thrust bearing to accommodate the combined load of the screws. This arrangement, while theoretically suitable for use with counter-rotating screws, is not suitable for use in extruders wherein the screws rotate in the same direction. Moreover, this arrangement is undesirable since the gear teeth are required to carry the thrust load in addition to the torque load of one screw. In many cases, the torque load is extremely high and, due to the limitation on the diameter of the gears, it is difficult to provide suitable gearing which will accommodate a high torque load alone without the necessity of withstanding the additional thrust load.

The present invention, as will be evident from the herein detailed description and the annexed drawings, successfully overcomes the above-mentioned problems, objections, shortcomings and limitations experienced heretofore in single screw and multiple screw extruders which create large thrust loads in operation.

The primary object of this invention is to provide a novel and useful bearing for effectively withstanding high thrust loads which may be created by a rotary screw.

Another object of this invention is to provide an improved hydrostatic thrust bearing for machines employing multiple screws, such as a twin screw plastic extruder.

The invention has for another object the provision of a hydrostatic thrust bearing for a multiple screw plastic extruder having at least one pair of parallel screws which are arranged substantially tangentially or in overlapping relation.

Another object of this invention is to provide a thrust bearing which is especially well suited for use in twin or multiple screw extruders and which combines features of high thrust load capacity and small overall diameter.

A further object of this invention is to provide a rotary screw thrust bearing which has a very long life in active use without appreciable wear.

A still further object of this invention is to provide a hydrostatic thrust bearing of the character indicated which is relatively simple and compact in design; which is durable in construction; which is reasonable in manufacturing and maintenance costs; and which is capable of performing its intended functions in a thoroughly effective and dependable manner.

The enumerated objects and additional objects, together with the several advantages and features of this invention, will be readily apparent to persons trained in the art from the following detailed description and the accompanying drawings which respectively describe and illustrate a machine embodying a preferred form of the invention and a modification thereof.

In the drawings, wherein like reference characters denote corresponding parts throughout the several views.

Figure 1:
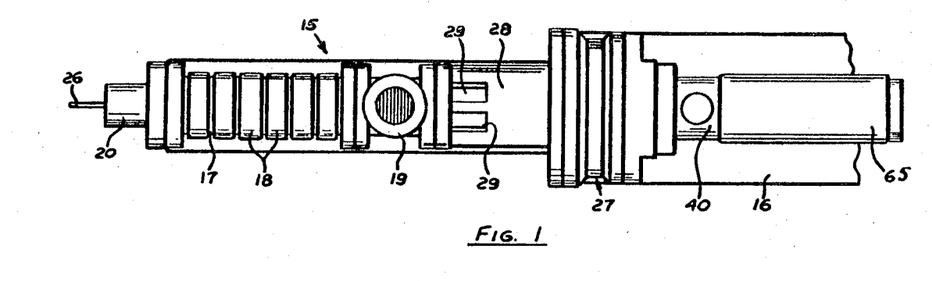
FIG. 1 is a top plan view of a twin screw plastic extruder that is equipped with a thrust bearing according to this invention, the thrust bearing temperature control system which is shown in another view being omitted.
Figures 2, 3:
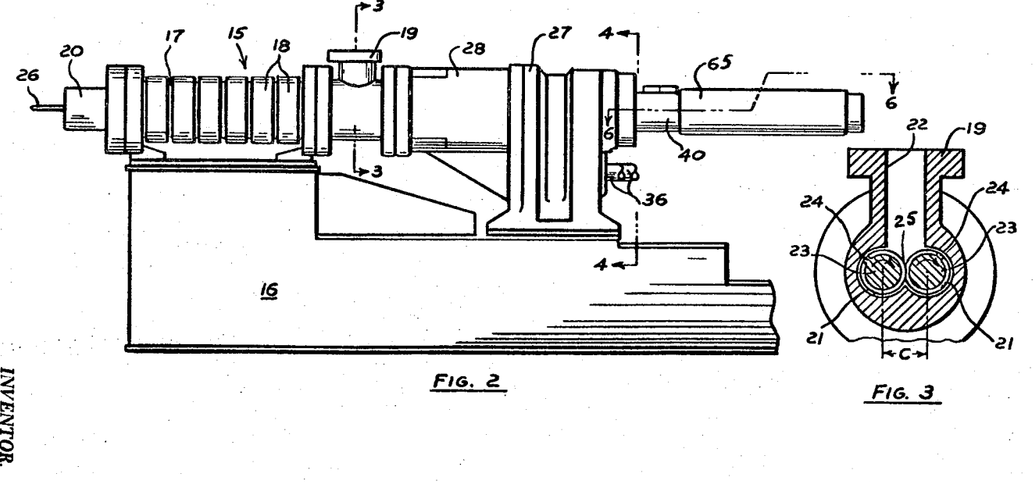
FIG. 2 is a side elevation view of the extruder shown in FIG. 1.
FIG. 3 is a view in enlargement taken along line 3—3 of FIG. 2.

Referring initially to FIGS. 1, 2 and 3, a twin screw plastic extruder, which is generally represented by numeral 15, is mounted on and anchored to a supporting base 16. The extruder includes a barrel 17 having heater units 18, a plastic feed section 19 secured to the rear end of the barrel and an extrusion die 20 secured to the front end of the barrel. As is shown in FIG. 3, barrel 17 and feed section 19 define a pair of intersecting or overlapping, internal parallel bores 21. The feed section is provided with an inlet passage 22 which communicates with both bores.

Positioned within each bore 21 is a rotary extruder screw 23 having flights 24. The flights of each screw intersect or overlap those of the other screw, as indicated at 25 in FIG. 3, so that the distance C between the longitudinal axes of the screws is less than the diameter of either screw. In the illustrated extruder construction, both screws 23 are adapted to rotate in the same direction, as indicated by the arrows in FIG. 3. It will be appreciated that the design may be readily modified to permit rotation of the screws in opposite directions, if desired.

The operation of extruder 15, as described up to this point, will now be outlined. Starting plastic material is introduced into feed section 19 by way of inlet passage 22 and is moved forwardly through barrel 17, i.e. toward the left as viewed in FIGS. 1 and 2, by screws 23. During such movement, the plastic material is melted by heat generated by heater units 18 and by frictional heat developed by mechanical working of the material in the screws. The melted plastic material is transmitted by the barrel into extrusion die 20 and is extruded by and discharged from the die in the form of a strip 26 or as a rod, tube or any other desired configuration depending on the design of the die. As discussed earlier herein, the internal pressure of the melted plastic material may reach a value of 6,000 p.s.i., or higher, at the discharge end of the barrel; and it is this pressure that results in a thrust load on the screws which acts toward the feed or rear end of the extruder.

Figure 5:
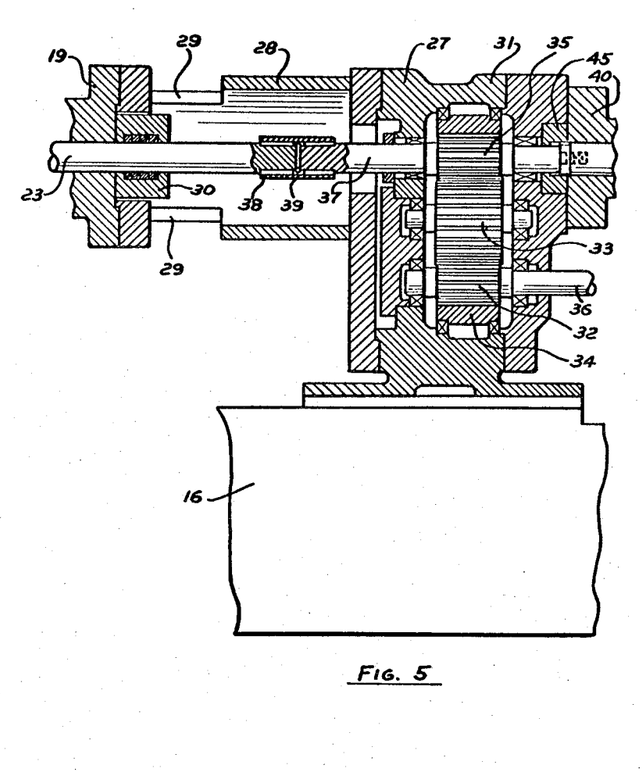
FIG. 5 is a view taken along staggered line 5—5 of FIG. 4.

Feed section 19 is connected to a gear unit 27 through the intermediary of a tubular spacer 28 having a plurality of openings 29 to permit access to parts therein. As is best shown in FIG. 5, the rear end portions of screws 23 are devoid of flights and project into spacer 28. These portions of the screws are provided with a stuffing box 30 to prevent leakage of the plastic material rearward of the feed section.

Figure 4:
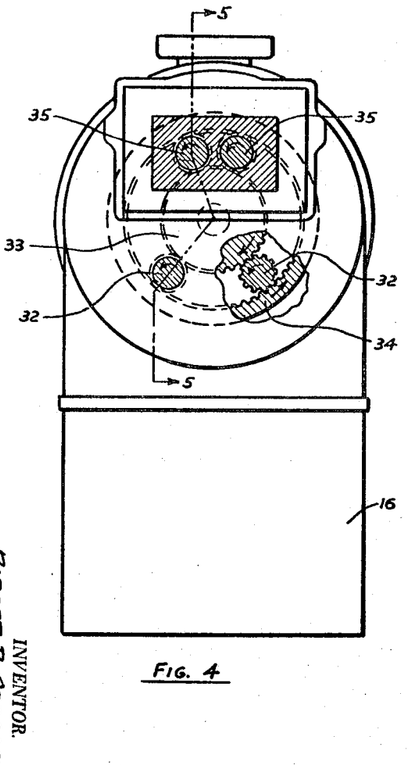
FIG. 4 is a view in enlargement taken along line 4—4 of FIG. 2.

Gear unit 27 includes a housing 31 which contains and supports a plurality of parallel pinions and gears, namely a pair of drive pinions 32, an idler gear 33, a ring gear 34 which is coaxial with the idler gear, and a pair of driven pinions 35. Pinions 32 and 35 mesh and cooperate with gears 33 and 34. The directions of rotation of the several pinions and gears are indicated by corresponding arrows in FIG. 4. Thus, counter-clockwise rotation of drive pinions 32 imparts clockwise rotation to idler gear 33 and counter-clockwise rotation to ring gear 34 which, in turn, impart counter-clockwise rotation to driven pinions 35.

Each drive pinion 32 is integral with an input shaft 36. The input shafts are adapted to be rotated in unison through the medium of a conventional primary gear arrangement (not shown) and a suitable driving means, such as an electric motor or a hydraulic motor (also not shown).

Each driven pinion 35 is integral with an output shaft 37 which extends into spacer 28. Each extruder screw 23 is detachably connected to a corresponding output shaft by a keyed sleeve coupling 38 to permit of ready assembly and disconnection, as required. A thrust washer 39 is positioned between the adjacent ends of each screw 23 and its output shaft. It will be apparent from the foregoing that both extruder screws are driven simultaneously and at the same speed by the output shafts. It is not necessary to provide means in gear unit 27 to accommodate thrust loads, created on the output shafts during operation, since these loads, as will be described next, are taken by hydrostatic thrust bearings which are the subject matter of this invention.

Figure 6:
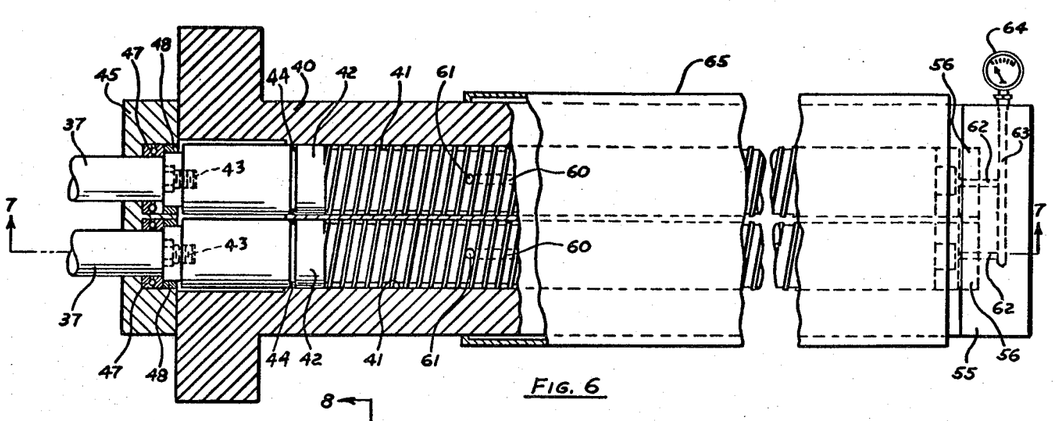
FIG. 6 is a view in enlargement taken along staggered line 6—6 of FIG. 2.
Figure 7:
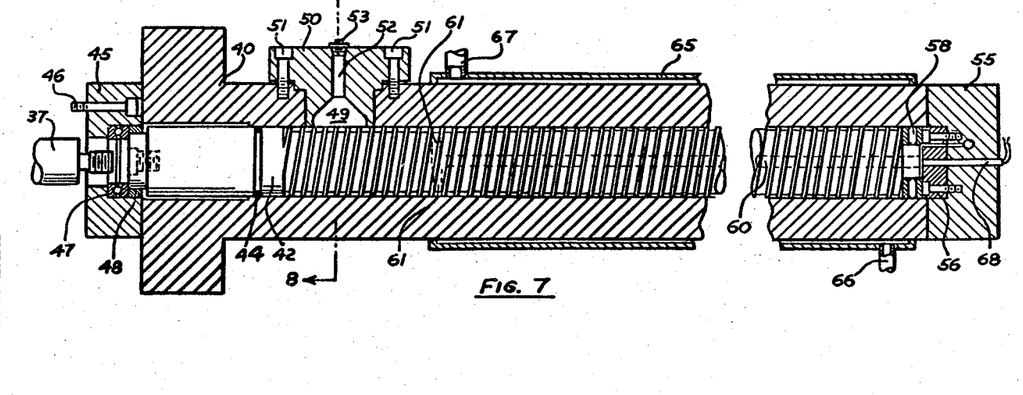
FIG. 7 is a view taken along line 7—7 of FIG. 6.
Figure 8:
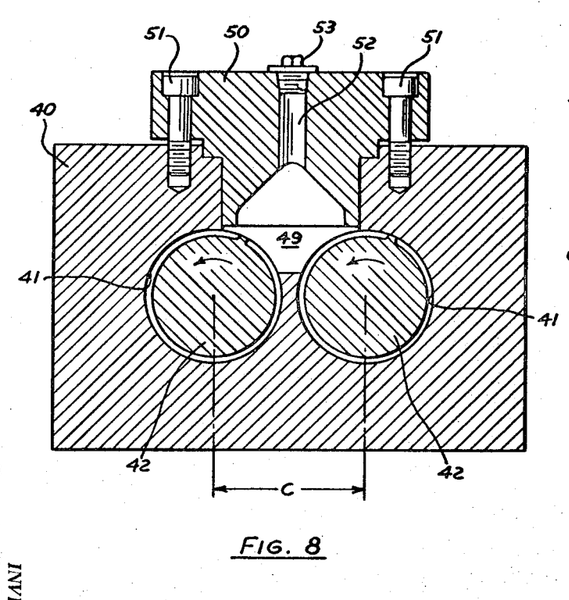
FIG. 8 is a view in enlargement taken along line 8—8 of FIG. 7.

Referring now to FIGS. 5, 6 and 7, a thrust barrel 40 is mounted on and secured to the rear end of gear housing 31, i.e., to the end of the gear housing which is remote from extruder barrel 17. The thrust barrel is provided with a pair of independent parallel bores 41, each of which is aligned with a corresponding extruder barrel bore 21. Positioned in each bore 41 is a thrust screw 42 having threads of opposite hand to those of extruder screws 23. The rearward peripheral portions of the thrust screws are devoid of threads and are coupled to corresponding output shafts 37 by threaded connections, as indicated at 43. These portions of the thrust screws are equipped with sealing rings 44 to prevent leakage to the left thereof, as viewed in FIGS. 6 and 7. A bearing housing 45 is located in a recess in gear housing 31 (FIG. 5) and is secured thereto by screws 46 (FIG. 7). As best shown in FIGS. 6 and 7, housing 45 contains an auxiliary thrust bearing 47 and an oil seal 48 for each extruder screw. These thrust bearings serve the function of absorbing minor thrust loads in the direction of the discharge end of the extruder. Such loads may occur, for example, when the extruder screws are being removed from the extruder.

Barrel 40 is formed with a fluid compartment 49 which communicates with both bores 41. The compartment is provided with a closure 50 that is secured to the barrel by screws 51. The closure has a central fill passage 52 which is provided with a threaded plug 53.

Figure 9:
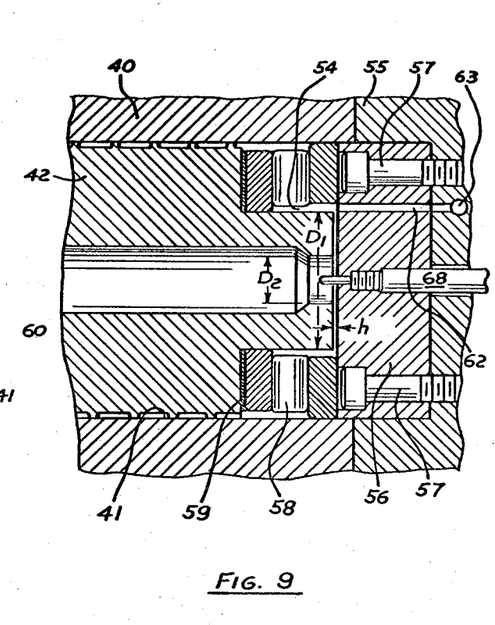
FIG. 9 is an enlarged fragmentary view of a portion of FIG. 7.

Each thrust screw 42 is stepped down at its free or forward end to define an annular recess 54 and an end portion of reduced diameter $D_1$ (FIG. 9). Anchored to the forward end of thrust barrel 40 by suitable means (not shown) is a thrust cap 55. A thrust plate 56 is positioned intermediate the thrust cap and the free end of each thrust screw 42 and is secured to the thrust cap by screws 57. A roller type thrust bearing 58 is disposed in each recess 54 and bears against a thrust screw and a corresponding thrust plate, as best shown in FIG. 9. Each thrust bearing is provided with a ring shim 59. The facing surfaces of the thrust screws and the thrust plates, consisting of the free end surface of each screw and the forward surface of the corresponding plate, are smoothly and accurately finished and arranged to define a thrust gap $h$ of uniform thickness throughout the thrust screw end areas having the diameter $D_1$.

The free end of each thrust screw 42 and the inner surface of its thrust plate 56, which are arranged as shown to define gap h, constitute elements of a hydrostatic thrust bearing according to this invention. An appropriate fluid, such as a suitable oil for use in operation of the hydrostatic thrust bearing, is introduced into compartment 49 by way of passage 52 in closure 50. This fluid fills the space between each thrust screw and its bore, the space in each recess 54 that is not occupied by a bearing 58 and shim 59, and the space represented by gap h. Each thrust screw is bored to provide an axial passage 60, which extends inwardly from its free end, and a pair of radial passages 61, which establish communication between passage 60 and the exterior of the screw at locations forward of fluid compartment 49. These passages constitute a fluid return means. The forward end of passage 60 has a diameter $D_2$.

In order to effect and maintain equal hydrostatic pressures in both spaces represented by thrust gap h, interconnecting passages 62 and 63 (FIG. 6) are provided in each thrust plate 56 and in thrust cap 55. The end of passage 63 which communicates with the atmosphere may be plugged or, as shown, may be provided with a pressure gauge 64 to indicate the hydrostatic fluid pressure. Since this pressure balances the extruder plastic discharge pressure, as will be explained further along herein, the gauge may, by proper calibration, serve as a convenient means for determining the plastic discharge pressure.

For the purpose of outlining the operation of the apparatus shown in FIGS. 1 through 9, it is assumed that starting plastic material is introduced into extruder 15 by way of passage 22 of feed section 19. It is also assumed that fluid compartment 49 and the spaces and passages within thrust barrel 40, to the right of fluid seals 44 (FIGS. 6 and 7), contain a suitable hydrostatic fluid. Rotation of input shafts 36 causes simultaneous and corresponding rotation of output shafts 37, extruder screws 23 and thrust screws 42. The plastic material is melted in extruder barrel 17 and is mechanically worked and moved forwardly or to the left, as viewed in FIGS. 1 and 2, by extruder screws 23. The plastic material, in melted and homogenized condition, is transmitted into die 20 and is extruded and discharged from the die in the form of a strip 26.

At start-up and during very low rotational speeds of the extruder screws, the thrust load created by these screws is taken by roller thrust bearings 58. Under these conditions, the thrust load is relatively small and well within the rated capacity of the roller thrust bearings. With increasing rotational speeds of the extruder screws, the hydrostatic fluid contained between the flights of thrust screws 42 is forced to the front of barrel 40, past roller thrust bearings 58, through thrust gaps h and then through passages 60 and 61, back to the starting region, thereby providing continuous circulation of the fluid. Because of the small thrust gaps h through which the hydrostatic fluid must pass, substantial fluid pressure is built up at the free ends of the thrust screws. This pressure acts on each annular area bounded by the screw end surface having the diameter $D_1$ and the outside diameter of the thrust screw and provides a thrust force on each thrust screw which counteracts the thrust force created by the corresponding extruder screw. When the force on the thrust screws exceeds that on the extruder screw, the screws are displaced toward the forward or discharge end of the extruder. Such displacement increases the size of thrust gaps h and results in a smaller fluid pressure drop through the thrust gaps and a consequential decrease in fluid pressure at the free ends of the thrust screws. The apparatus is so designed that, under normal operating conditions, the extruder screw thrust load is balanced by the thrust screw force with essentially no load on roller thrust bearings 58. As a consequence, the screws float axially during operation and assume an equilibrium position according to the rotational speed, plastic discharge pressure and other factors which will be discussed further along.

Tests were successfully conducted with apparatus of this invention employing 3″ diameter extruder screws which were operated at plastic discharge pressures ranging from 100 to 10,000 p.s.i. and screw speeds ranging from 20 to 200 r.p.m. The outside diameters of the thrust screws were 3″ and the diameters $D_1$ and $D_2$ were 1½″ and ½″, respectively.

The thrust gap h is calculated from the equation $$h^3 = \frac{6v \log N\left(\frac{D_1}{D_2}\right)Q}{\pi P}$$

wherein:

$v$ is the viscosity of the thrust bearing fluid;
$D_1$ is the diameter of the free end of a thrust screw;
$D_2$ is the diameter of the front end of the thrust screw passage 60;
$Q$ is the rate of fluid flow through gap h; and
$P$ is the fluid pressure drop through gap h.

The fluid flow rate Q is determined by the design of the thrust screw flights and is approximately proportional to the screw rotation speed N. Inasmuch as diameters $D_1$ and $D_2$ are constants, thrust gap h is proportional to the cube root of $vN/P$.

Based on the above designated extruder specifications, it has been calculated that thrust gap h may vary from about .004″ to about .010″ over the entire range of screw speeds and discharge pressures. This causes the screws to move a maximum axial distance of .006″, which is negligible and does not adversely affect efficient operation of the extruder. The calculated values were closely confirmed by careful tests.

Since thrust gap opening h is dependent on the viscosity of the hydrostatic fluid, it is preferable, in extruder and related apparatus utilizing this invention, that a relatively high viscosity fluid be used to provide a reasonable value for the thrust gap. Also, it has been ascertained theoretically and experimentally that the hydrostatic fluid should preferably have the several properties and characteristics which are identified and discussed below:

(1) The viscosity of the fluid should decrease with increasing temperature. As the screw speed is increased, the temperature of the fluid will increase due to the increased mechanical working of the fluid by the thrust screws. As indicated by the above-noted relationship of $h^3$ being proportional to $vN/P$, a decrease in fluid viscosity due to temperature rise will offset the effect of increase in screw speed and result in a minimum change in thrust gap h.

(2) The viscosity of the fluid should increase with increasing pressure. Referring again to the relationship of $h^3$ being proportional to $vN/P$, an increase in pressure resulting from higher plastic discharge pressure will result in an increase in fluid viscosity and in a minimum change in thrust gap h.

(3) The fluid should be Newtonian or non-shear dependent so that its viscosity will not change under encountered conditions of thrust screw speed and thrust gap size.

One hydrostatic fluid having the foregoing properties and characteristics and found suitable for use in hydrostatic thrust bearings is a lubricating oil that is marketed in this country by Humble Oil Company under the trade designation "Penzoil 2600."

Figure 10:
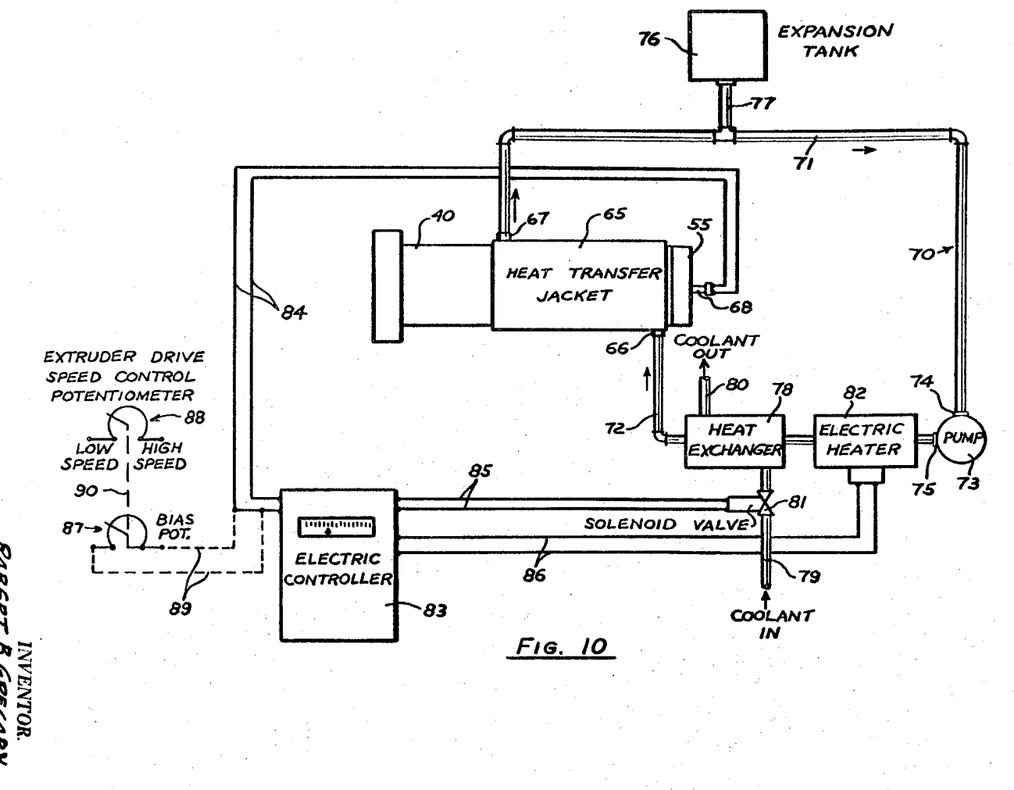
FIG. 10 is a generally schematic representation of the referred-to temperature control system for the thrust bearing.

Reference is next had to various views, particularly to FIG. 10, for an understanding of a means for controlling the temperature of the hydrostatic fluid in thrust barrel 40. This means includes a heat transfer jacket 65 which surrounds the major portion of the thrust barrel and which has an inlet 66 and an outlet 67 (FIG. 7). A thermocouple 68 extends through thrust cap 55 and one of the thrust plates. The thermocouple is so arranged that its tip projects a short distance into a corresponding passage 60 (FIG. 9).

Jacket 65 is series-connected with a fluid flow means 70 which comprises a first conduit 71, a second conduit 72 and a pump 73 having an inlet 74 and an outlet 75. Conduit 71 is connected at one end to jacket outlet 67 and at its other end to pump inlet 74. Conduit 72 is connected at one end to pump outlet 75 and at its other end to jacket inlet 66. A suitable heat transfer fluid is circulated by the pump through the heat transfer jacket and the flow means in the direction indicated by arrows in FIG. 10. An expansion tank 76, which serves as a resevoir for a supply of the heat transfer fluid, communicates with conduit 71 by way of a conduit 77.

One section of conduit 72 is equipped with a heat exchanger 78 for lowering the temperature of the heat transfer fluid during flow therethrough, as required. A suitable fluid coolant is supplied to the heat exchanger by a conduit 79 and is withdrawn therefrom by a conduit 80. Interposed in conduit 79 is a normally closed solenoid-actuated valve 81 for controlling admission of the coolant into the heat exchanger.

Another section on conduit 72 is equipped with a normally inactive electric heater 82 for raising the temperature of heat transfer fluid during flow therethrough, as required.

Heat exchanger 78 and electric heater 82 are selectively placed into and out of active service, as needed, in response to variations in temperature of the hydrostatic fluid in the thrust barrel by an electric controller 83. The controller may be of any suitable known three-position construction. It is electrically connected by conductors 84 to thermocouple 68, by conductors 85 to solenoid-actuated valve 81 and by conductors 86 to electric heater 82. Controller 83 is so constructed and arranged that, if the temperature of the hydrostatic fluid, as measured by thermocouple 68, rises above a predetermined value, it will automatically energize solenoid valve 81 from closed to open position. This allows the fluid coolant to pass through heat exchanger 78 and lower the temperature of the hydrostatic fluid flowing therethrough to a desired value, at which time the solenoid valve is automatically deenergized and returned to closed position. If, on the other hand, the temperature of the hydrostatic fluid decreases below a preselected value, controller 83 will automatically energize heater 82 and place it in active service whereby the temperature of the hydrostatic fluid passing therethrough is raised to a desired value. At that time, the heater is automatically deenergized and rendered inactive.

The above-described means for controlling the temperature of the hydrostatic fluid is entirely satisfactory for extruder operation within a moderate screw speed range, such as 50 to 125 r.p.m. However, if the extruder is intended for operation over a wide range of screw speeds and discharge pressures, such as speeds ranging from 20 to 200 r.p.m. and pressures ranging from 100 to 10,000 p.s.i., it is desirable to control the viscosity of the hydrostatic fluid to thereby minimize variations in the size of thrust gap $h$ by automatically controlling its temperature over the screw speed range. To this end, auxiliary equipment, including a potentiometer 87 and an extruder drive speed control potentiometer or regulator 88, is provided. Potentiometer 87 is adapted to be connected in series with thermocouple 68 and controller 83, as shown. Regulator 88 is connected and is responsive to variations in speed of the extruder drive means. Potentiometer 87 is coupled to and operated by the regulator through the medium of conventional mechanical means generally indicated by numeral 90.

Upon increase in speed of the extruder drive means, potentiometer 87 is automatically operated in a manner to increase the resistance in the thermocouple-controller circuit, resulting in a corresponding decrease in the voltage signal from the thermocouple to the controller. This, in turn, causes the heater 82 to be energized whereby to raise the temperature of the hydrostatic fluid to a desired equilibrium value. The rise in hydrostatic fluid temperature effects desired decrease in its viscosity to a value suitable for the higher screw speed operation. Similarly, upon reduction in screw speed, potentiometer 87 automatically reduces the resistance in the indicated circuit to thereby place heat exchanger 78 in active service and raise the viscosity of the hydrostatic fluid. The actual effect of increasing the resistance in the thermocouple lead is to raise the set point of the electrical controller above that originally established, thus forcing the system to come to thermal equilibrium at a higher temperature. In operation the set point of the controller would be established at the correct temperature for low screw speed operation; and, when the extruder speed is increased, the set point is automatically raised to a new value to correspond to the temperature required to obtain the correct viscosity of the hydrostatic fluid at the new screw speed.

Figure 11:
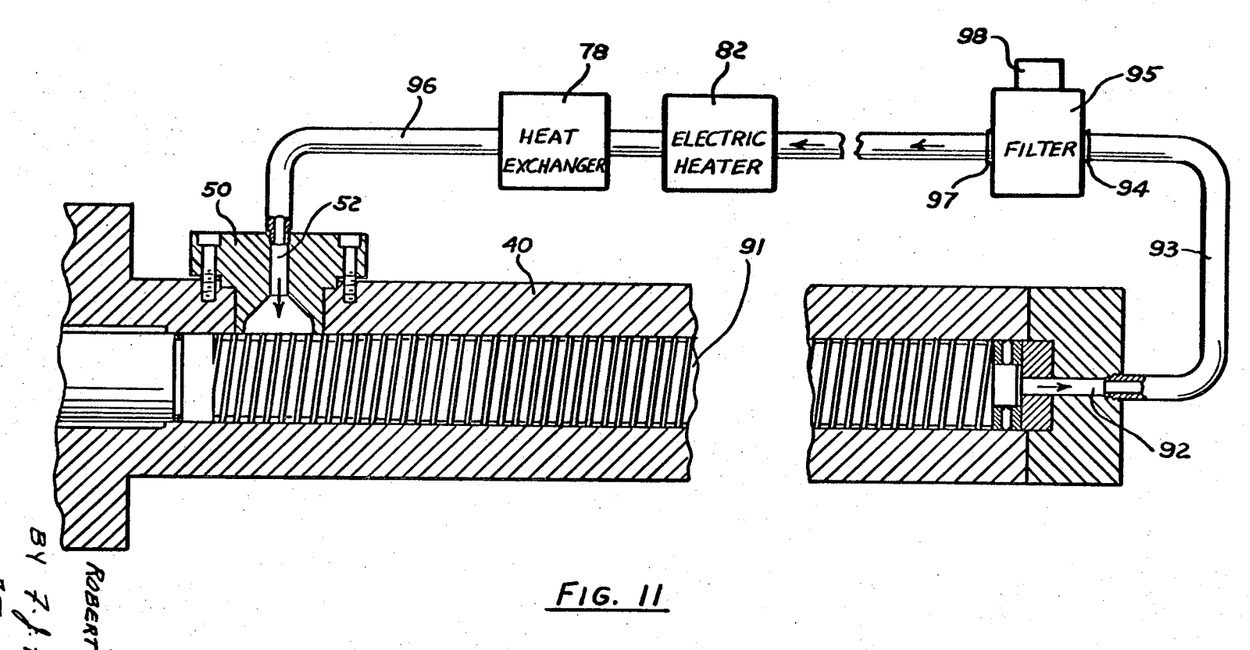
FIG. 11 is a view corresponding to FIG. 7 and illustrating a modification of the invention, the temperature control system therefor being shown schematically.

The modification of the invention illustrated in FIG. 11 contemplates return flow of hydrostatic fluid from the thrust bearings to the feed ends of the thrust screws by way of external means instead of through passages in the thrust screws. This form of the invention has the important advantage, among others, of providing continuous filtering of the hydrostatic fluid. In FIG. 11, a solid thrust screw 91 corresponds generally to earlier described thrust screws 42 and is devoid of internal passages. A passage 92 establishes communication between thrust gap $h$ and the exterior of the barrel. A first conduit 93 connects the outer end of passage 92 with the inlet 94 of a fluid filter 95 while a second conduit 96 connects the outlet 97 of the filter with passage 52 in fill section 50. Conduit 96 is equipped with a heat exchanger 78 and an electric heater 82, which were described above. Filter 95 includes a removable top closure unit 98. This unit, when opened, permits access to the interior of the filter and introduction of a sufficient quantity of the hydrostatic fluid to fill the several conduits, passages, etc. in the hydrostatic fluid system.

The construction appearing in FIG. 11 is preferably provided with temperature control means (not shown) which may be the same as or similar to those of the earlier described form of the invention. It will be appreciated that the return flow of hydrostatic fluid from each thrust bearing may be combined by suitable connections upstream of filter inlet 94, whereby only one filter, one electric heater and one heat exchanger will be required.

From the foregoing, it is believed that the objects, advantages, construction and operation of the present invention will be readily comprehended by persons skilled in the art, without further description. Although the invention has been herein shown and described in several practicable forms, it is recognized that certain parts or elements thereof are representative of other parts of elements which may be used in substantially the same manner to accomplish substantially the same results. Therefore, it is to be understood that the invention is not to be limited to the exact details described herein, but is to be accorded the full scope and protection of the following claims.

I claim:

1. In combination: a first barrel defining a longitudinal first bore and including intake means communicating with the rear portion of the bore and discharge means communicating with the forward portion of the bore; a rotary first screw in the bore and adapted to move material, which is introduced into the bore by way of the intake means, forwardly along the bore to the discharge means, the material in the course of such movement being subjected to a differential pressure which exerts a rearward axial thrust on the screw; a thrust barrel defining a longitudinal second bore and including an inlet for introducing fluid into the rear portion of the second bore; a rotary thrust screw in the second bore, said screws being coaxial and of opposite hand and projecting in opposite directions, the forward end of the thrust screw and the thrust barrel defining a thrust gap which communicates with the second bore; fluid flow means establishing communication between the thrust gap and the inlet; and driving means for imparting rotation to said screws simultaneously.

2. The combination according to claim 1 wherein the driving means includes rotary means intermediate and connected to the rear ends of said screws.

3. In combination: a first barrel defining a plurality of parallel longitudinal first bores and including intake means communicating with the rear portion of each bore and discharge means communicating with the forward portion of each bore; a plurality of rotary first screws, each first screw being positioned in a corresponding bore and adapted to move material, which is introduced into its bore by way of the intake means, forwardly along such bore to the discharge means, the material in the course of such movement being subjected to a differential pressure which exerts a rearward axial thrust on the screw; a thrust barrel defining a plurality of parallel longitudinal second bores and including inlet means for introducing fluid into the rear portion of each second bore; a plurality of rotary thrust screws, each thrust screw being positioned in a corresponding second bore and coaxial with a corresponding first screw, said first screws and thrust screws being of opposite hand and projecting in opposite directions, the forward end of each thrust screw and a corresponding portion of the thrust barrel defining a thrust gap which communicates with a corresponding second bore; fluid flow means establishing communication between each thrust gap and the inlet means; and driving means for imparting rotation to said screws simultaneously.

4. The combination according to claim 3 wherein the driving means includes rotary means intermediate and connected to the rear ends of said screws.

5. The combination according to claim 4 wherein the rotary means comprises a shaft connected to each first screw and a corresponding thrust screw.

6. The combination according to claim 3 wherein a pair of the first bores intersect each other.

7. The combination according to claim 6 wherein the axes of rotation of the pair of first screws in said pair of first bores are spaced apart a predetermined distance having a maximum value that is substantially equal to the diameter of one of said pair of screws.

8. The combination according to claim 6 wherein the distance between the axes of rotation of the pair of first screws in said first pair of bores is substantially equal to the diameter of one of said pair of screws.

9. The combination according to claim 6 wherein the distance between the axes of rotation of the pair of first screws in said first pair of bores is less than the diameter of one of said pair of screws.

10. The combination according to claim 3 including means establishing communication between the thrust gaps.

11. The combination according to claim 3 wherein the fluid flow means includes a passage in each thrust screw which communicates directly with the corresponding thrust gap and with the corresponding bore at a location intermediate such thrust gap and the inlet means.

12. The combination according to claim 11 including means establishing communication between the thrust gaps.

13. The combination according to claim 3 wherein the fluid flow means comprises conduit means establishing communication between each thrust gap and the inlet means, said conduit means being independent of the thrust screw.

14. The combination according to claim 13 including means establishing communication between the thrust gaps.

15. The combination according to claim 3 including means for controlling the temperature of the fluid in the thrust barrel.

16. The combination according to claim 3 including means responsive to the temperature of the fluid in a thrust gap for controlling the temperature of the fluid admitted to the inlet means.

17. The combination according to claim 3 including means responsive to the speed of rotation of a first screw for controlling the temperature of the fluid admitted to the inlet means.

18. The combination according to claim 3 including means responsive to the temperature of the fluid in a thrust gap and to the speed of rotation of a first screw for controlling the temperature of the fluid admitted to the inlet means.

References Cited

UNITED STATES PATENTS

| | | |
|---|---|---|
| 2,535,865 | 12/1950 | Poncelet. |
| 2,848,739 | 8/1958 | Henning. |
| 2,944,288 | 7/1960 | Sherman. |
| 3,154,808 | 11/1964 | Ahlefeld et al. |
| 3,163,693 | 12/1964 | Stenger. |
| 3,304,578 | 2/1967 | Clute. |

FOREIGN PATENTS

| | | |
|---|---|---|
| 23,027 | 1962 | Germany. |

WILLIAM J. STEPHENSON, *Primary Examiner.*